United States Patent
Chopra et al.

(10) Patent No.: US 12,526,190 B2
(45) Date of Patent: Jan. 13, 2026

(54) AUTOMATED POWER ON NOTIFICATION SYSTEM AND METHOD THEREOF

(71) Applicant: Rakuten Symphony, Inc., Tokyo (JP)

(72) Inventors: Akashdeep Chopra, Tokyo (JP); Chandan Kumar Singh, Tokyo (JP); Ashish Madan, Tokyo (JP); Manish Kumar, Tokyo (JP); Praveen Tripathi, Indore (IN); Vishal Ghan, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 350 days.

(21) Appl. No.: 18/114,082

(22) Filed: Feb. 24, 2023

(65) Prior Publication Data

US 2024/0291714 A1  Aug. 29, 2024

(51) Int. Cl.
  *H04L 41/0823* (2022.01)
  *G06F 1/28* (2006.01)
  *H04L 47/12* (2022.01)

(52) U.S. Cl.
  CPC ............ *H04L 41/0823* (2013.01); *G06F 1/28* (2013.01); *H04L 47/12* (2013.01)

(58) Field of Classification Search
  CPC ........ H04L 41/0823; H04L 47/12; G06F 1/28
  See application file for complete search history.

(56) References Cited

U.S. PATENT DOCUMENTS

| | | | | |
|---|---|---|---|---|
| 8,443,072 B1 * | 5/2013 | Orbach | .................... | H04L 47/25 709/227 |
| 9,986,525 B1 * | 5/2018 | Chiang | ............... | H04L 65/1073 |
| 2010/0159948 A1 * | 6/2010 | Spivey | .................. | H04W 48/18 455/456.1 |
| 2011/0105102 A1 * | 5/2011 | Jutzi | ................. | H04W 52/0229 455/419 |
| 2011/0319029 A1 * | 12/2011 | Caudill | .................... | H04B 3/46 455/67.11 |
| 2012/0064884 A1 * | 3/2012 | Ramachandran | ..... | H04W 76/18 455/422.1 |

(Continued)

FOREIGN PATENT DOCUMENTS

| CN | 110999402 A | * | 4/2020 | ....... H04N 21/47202 |
|---|---|---|---|---|
| CN | 111711680 A | * | 9/2020 | ........... H04L 69/164 |

(Continued)

*Primary Examiner* — Shean Tokuta (74) *Attorney, Agent, or Firm* — HAUPTMAN HAM, LLP (57) ABSTRACT

An automated power on notification system includes a non-transitory computer readable medium configured to store instructions thereon. The system further includes a processor connected to the non-transitory computer readable medium. The processor is configured to execute the instructions for detecting a failure to establish a connection with a newly powered on component. The processor is further configured to instruct a transmitter to transmit a periodic timer signal to the newly powered on component, wherein the periodic timer signal indicates a time period for the newly powered on component to wait prior to repeating an attempt to connect to a network. The processor is further configured to receive a connection request from the newly powered on component after the time period has elapsed. The processor is further configured to establish a connection between the newly powered on component and the network.

20 Claims, 8 Drawing Sheets

(56) References Cited

U.S. PATENT DOCUMENTS

| | | | | |
|---|---|---|---|---|
| 2012/0082107 | A1* | 4/2012 | Ou | H04W 74/0833 |
| | | | | 370/329 |
| 2014/0181582 | A1* | 6/2014 | Kujawa | G06F 11/1443 |
| | | | | 714/16 |
| 2015/0373577 | A1* | 12/2015 | Yang | H04W 72/21 |
| | | | | 455/435.1 |
| 2016/0098330 | A1* | 4/2016 | Mu | G06F 3/0619 |
| | | | | 714/6.23 |
| 2018/0077728 | A1* | 3/2018 | Shi | H04W 76/10 |
| 2018/0310247 | A1* | 10/2018 | Chu | H04W 52/0235 |
| 2019/0182665 | A1* | 6/2019 | Edge | H04W 12/06 |
| 2020/0403866 | A1* | 12/2020 | Hayes | H04L 67/1089 |
| 2021/0149757 | A1* | 5/2021 | Ozturk | G06F 11/0796 |
| 2021/0243832 | A1* | 8/2021 | Teyeb | H04W 76/18 |
| 2022/0312540 | A1* | 9/2022 | da Silva | H04W 76/30 |
| 2024/0291714 | A1* | 8/2024 | Chopra | G06F 1/28 |

FOREIGN PATENT DOCUMENTS

| | | | | | |
|---|---|---|---|---|---|
| CN | 112114524 | A | * | 12/2020 | G05B 15/02 |
| EP | 3122061 | A1 | * | 1/2017 | H04B 3/546 |
| ES | 2644481 | T3 | * | 11/2017 | H04L 5/06 |
| JP | 6530888 | B2 | * | 6/2019 | |
| JP | 2020182023 | A | * | 11/2020 | H04L 45/48 |
| RU | 2733072 | C1 | * | 9/2020 | H04W 74/0833 |
| WO | WO-2013126496 | A1 | * | 8/2013 | H04M 1/72412 |
| WO | WO-2022067356 | A2 | * | 3/2022 | H04W 28/0289 |
| WO | WO-2022187186 | A1 | * | 9/2022 | H04W 76/18 |
| WO | WO-2023278414 | A1 | * | 1/2023 | H04L 47/11 |
| WO | WO-2023033701 | A1 | * | 3/2023 | H04W 24/08 |

* cited by examiner

AUTOMATED POWER ON NOTIFICATION SYSTEM AND METHOD THEREOF

BACKGROUND

When a new component is installed in a network or a component already connected to the network is rebooted, a connection is established between the newly powered on component and other equipment within the network. In some instances, the connection is not established. In such a situation, the network continually attempts to establish the connection every second until the connection is established.

SUMMARY

An aspect of this description relates to an automated power on notification system. The automated power on notification system includes a non-transitory computer readable medium configured to store instructions thereon. The automated power on notification system includes a processor connected to the non-transitory computer readable medium. The processor is configured to execute the instructions for detecting a failure to establish a connection with a newly powered on component. The processor is further configured to execute the instructions for instructing a transmitter to transmit a periodic timer signal to the newly powered on component, wherein the periodic timer signal indicates a time period for the newly powered on component to wait prior to repeating an attempt to connect to a network. The processor is further configured to execute the instructions for receiving a connection request from the newly powered on component after the time period has elapsed. The processor is further configured to execute the instructions for establishing a connection between the newly powered on component and the network.

An aspect of this description relates to an automated power on notification method. The automated power on notification method includes detecting a failure to establish a connection with a newly powered on component. The automated power on notification method further includes transmitting a periodic timer signal to the newly powered on component, wherein the periodic timer signal indicates a time period for the newly powered on component to wait prior to repeating an attempt to connect to a network. The automated power on notification method further includes receiving a connection request from the newly powered on component after the time period has elapsed. The automated power on notification method further includes establishing a connection between the newly powered on component and the network.

An aspect of this description relates to a non-transitory computer readable medium configured to store instructions. The instructions when executed cause a processor to detect a failure to establish a connection with a newly powered on component. The instructions further cause the processor to instruct a transmitter to transmit a periodic timer signal to the newly powered on component, wherein the periodic timer signal indicates a time period for the newly powered on component to wait prior to repeating an attempt to connect to a network. The instructions further cause the processor to receive a connection request from the newly powered on component after the time period has elapsed. The instructions further cause the processor to establish a connection between the newly powered on component and the network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When an attempt to connect to a newly powered on component of a network fails, rapid repeated attempts to establish the connection increase processing load and congestion on the network. This processing load and congestion increases a risk that users connected to the network will experience slower or unreliable connections to the network. Further, in some instances, information about the newly powered on component, such as inventory information, is not yet available to other devices within the network. As a result, the repeated attempts to establish the connection to the newly powered on component will continue to fail until the information is made available to the other devices. This type of situation means that the repeated attempts have no chance for success and consume processing load and network bandwidth for no reasonable expectation of success. The processing load and congestion issues are significantly compounded as the number of newly powered on components increase. Networks include hundreds of thousands of components in some instances. A major power outage, a major software update, or establishment of several new sites within the network will significantly exacerbate the processing load and congestion issues.

The current description provides a system which utilizes an orchestrator that performs periodic connection attempts to establish connections to newly powered on components. These periodic connection attempts reduce a number of attempts to establish the connection to the newly powered on components within a certain time period. As a result, processing loading and congestion in the network is reduces and a risk of poor or unreliable service to users is reduced. In some embodiments, a time period between connection attempts is controlled by the orchestrator based on a type of failure experienced during a previous connection attempt. In some embodiments, the orchestrator uses a Netconf protocol for establishing connections to the newly powered on component.

The use of the orchestrator also reduces a burden on a network monitor to review failures at attempted connections to the newly powered on component by automating the connection process. When a network is attempting to connect to hundreds or thousands, or even more, components the burden on a network monitor is immense. Using the orchestrator provides the network monitor with an automated process for establishing the connection to the newly powered on components and permits the network monitor to focus on other concerns within the network, such as error logs, outages, or other such concerns, to maintain acceptable network performance for the users.

Figure 1:
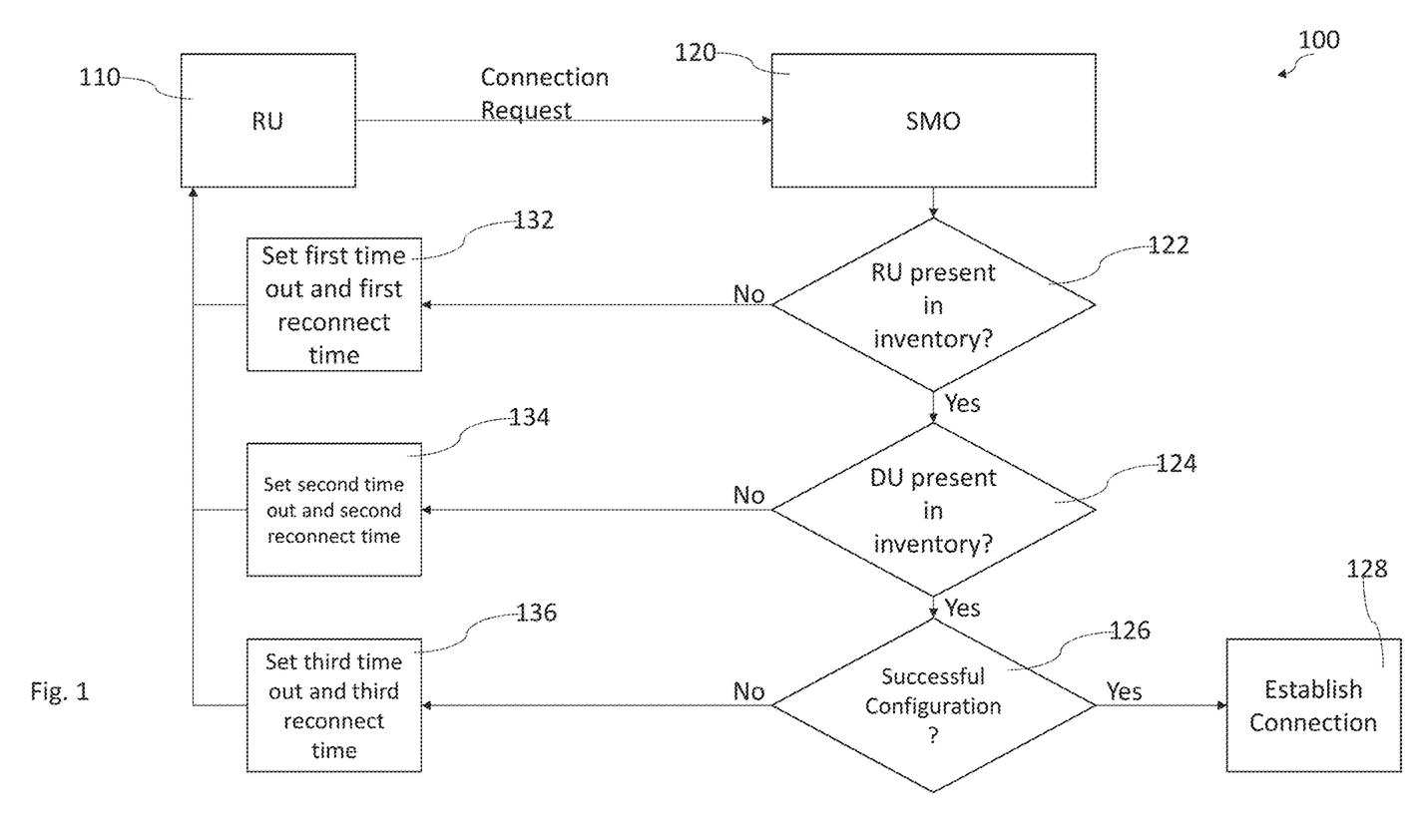
FIG. 1 is a flowchart of a method of automating a power on notification system in accordance with some embodiments.

FIG. 1 is a flowchart of a method 100 of automating a power on notification system in accordance with some embodiments. The method 100 is implemented using a radio unit (RU) 110 and a service management orchestrator (SMO) 120. While the description of the method 100 refers to an RU and a SMO, one of ordinary skill in the art would understand that the method 100 is capable of being implemented using multiple RUs and multiple SMOs. In some embodiments, a telecommunication network will include a large number of RUs, for example, some telecommunication networks include 100,000 or more RUs. In some embodiments, the telecommunication network includes a single SMO. In some embodiments, the telecommunication network includes multiple SMOs. The SMO 120 is used to automatically connect the RU 110 to another component within the telecommunication network, such as a distributed unit (DU). The DU is a higher level component within the telecommunication network that is configured to control the operation of one or more RUs. In some embodiments, the DU is located at a same base station as the RU 110. In some embodiments, the DU is located remotely from the RU 110. In some embodiments, the DU is capable of connecting to the RU 110 via a wired connection. In some embodiments, the DU is capable of connecting to the RU 110 wirelessly. The SMO 120 is configured to control the process of connecting the RU 110 to the DU to reduce processing load within the SMO 120 and congestion within the telecommunication network. In some embodiments, each of the RU 110, the SMO 120 and the DU are components within an open random access network (O-RAN). In some embodiments, the RU 110 is referred to as an open-RU (O-RU). In some embodiments, the DU is referred to as an open-DU (O-DU).

During a power-on (PON) sequence, the RU 110 is configured to transmit a connection request to the SMO 120. In some embodiments, the PON sequence is initiated in response to the RU 110 being first connected to the telecommunication network. In some embodiments, the PON sequence is initiated in response to an update or reboot of the RU 110. In some embodiments, the PON sequence is initiated in response to restoration of power to the RU 110 following a power outage. Other reasons for the initiation of the PON sequence are within the scope of this description.

In response to receiving the connection request, the SMO 120 requests identifying information from the RU 110, in operation 122. In some embodiments, the identifying information includes a serial number, an Internet Protocol (IP) address, or other suitable identifying information. Based on the identifying information, the SMO 120 searches for the RU 110 in an inventory. In some embodiments, the inventory includes a database of components within the telecommunication network. In some embodiments, the inventory is connected to the SMO 120 by a wired connection. In some embodiments, the inventory is connected to the SMO 120 wirelessly. The SMO 120 receives a response from the inventory regarding whether the RU 110 is included in the listing of components within the inventory based on the identifying information. In some instances, the RU 110 is not in the inventory because the inventory has not yet been updated to include the RU 110, for example, when the RU 110 is a newly added component. In some instances, the RU 110 is not found in the inventory because the inventory has experienced some power outage or other error. In response to a determination that the RU 110 is not present in the inventory, the method 100 proceeds to operation 132. In response to a determination that the RU 110 is present in the inventory, the method 100 proceeds to operation 124.

In operation 124, the SMO 120 again queries the inventory to identify whether a DU associated with the RU 110 is present in the inventory. Based on the identifying information for the RU 110 and information from the inventory, the SMO 120 is configured to determine which DU within telecommunication network should be connected to the RU 110. The SMO 120 searches the inventory to determine whether the DU that should be connected to the RU 110 is in the inventory. In some instances, the DU is not in the inventory because the inventory has not yet been updated to include the DU, for example, when the DU is a newly added component. In some instances, the DU is not found in the inventory because the inventory has experienced some power outage or other error. In response to a determination that the DU is not present in the inventory, the method 100 proceeds to operation 134. In response to a determination that the DU is present in the inventory, the method 100 proceeds to operation 126.

In operation 126, the SMO 120 retrieves information related to the DU from the inventory to determine how the RU 110 should be configured to connect to the DU. In some embodiments, the information related to the DU relates to the technology used by the DU, such as fifth generation (5G), fourth generation (4G), long term evolution (LTE), or other suitable communication technologies. In response to receiving the configuration information from the inventory, the SMO 120 transmits the configuration information to the RU 110 and the RU 110 attempts to connect to the DU based on the received configuration information. In some instances, the configuration fails because the DU is offline, a connection technology within the RU 110 is not consistent with the DU, or due to other potential errors. In response to a determination that the configuration is not successful, the method 100 proceeds to operation 136. In response to a determination that the configuration is successful, the method 100 proceeds to operation 128.

In operation 128, the RU 110 is able to begin connecting to terminal devices and conveying information between the terminal devices and the DU in order to provide the terminal devices with access to the telecommunication network. During the connection between the RU 110 and the DU, the DU is able to control operations within the RU 110, such as beamforming, software updates, or other suitable operations within the RU 110.

In operation 132, a first time out is set and a first reconnect time is set. The first time out is a time period during which the RU 110 should await additional communication from the SMO 120 prior to dropping the connection to the SMO 120. The first reconnect time is a time period that the RU 110 should wait before sending a new connection request to the SMO 120. In some embodiments, the first time out ranges from about 45 seconds to about 5 minutes. In some embodiments, the first time out is about 1 minute. If the first time out is too long, then power consumption by the RU 110 and congestion of the connection with the SMO 120 increases, in some instances. If the first time out is too short, then a risk that the RU 110 drops the connection with the SMO 120 even when a successful connection to the DU is still likely based on the most recent connection request from the RU 110 to the SMO 120, in some instances. In some embodiments, the first reconnect time ranges from about 5 minutes to about 1 hour. In some embodiments, the first reconnect time is about 10 minutes. If the first reconnect time is too long, then a delay in connecting the RU 110 to the DU, and the resulting ability to connect terminal devices to the RU 110, is increased, in some instances. If the first reconnect time is too short, then congestion and processing load within the SMO 120 increases without an increase in a likelihood of success in connecting the RU 110 to the DU, in some instances. In some embodiments, the SMO 120 is configured to determine at least one of the first time out or the first reconnect time based on a periodicity in which the inventory is updated. In some embodiments, the SMO 120 is configured to determine at least one of the first time out or the first reconnect time based on empirical data for new equipment to appear in the inventory. In some embodiments, the SMO 120 is configured to determine at least one of the first time out or the first reconnect time based on an input from a network manager. By using the first time out and the first reconnect time to disconnect the RU 110 from the SMO 120, processing capacity within the SMO 120 is able to be allocated to connecting other RUs to the telecommunication network. As a result, service to terminal devices is established faster across the entirety of the network by avoiding consuming SMO 120 capacity by continually attempting to connect the RU 110 that is not yet able to be properly connected to the telecommunication network.

In operation 134, a second time out is set and a second reconnect time is set. The second time out is a time period during which the RU 110 should await additional communication from the SMO 120 prior to dropping the connection to the SMO 120. The second reconnect time is a time period that the RU 110 should wait before sending a new connection request to the SMO 120. In some embodiments, the second time out ranges from about 45 seconds to about 5 minutes. In some embodiments, the second time out is about 1 minute. If the second time out is too long, then power consumption by the RU 110 and congestion of the connection with the SMO 120 increases, in some instances. If the second time out is too short, then a risk that the RU 110 drops the connection with the SMO 120 even when a successful connection to the DU is still likely based on the most recent connection request from the RU 110 to the SMO 120, in some instances. In some embodiments, a duration of the first time out is equal to a duration of the second time out. In some embodiments, the duration of the first time out is different from the duration of the second time out. In some embodiments, the second reconnect time ranges from about 5 minutes to about 1 hour. In some embodiments, the second reconnect time is about 10 minutes. If the second reconnect time is too long, then a delay in connecting the RU 110 to the DU, and the resulting ability to connect terminal devices to the RU 110, is increased, in some instances. If the second reconnect time is too short, then congestion and processing load within the SMO 120 increases without an increase in a likelihood of success in connecting the RU 110 to the DU, in some instances. In some embodiments, a duration of the first reconnect time is equal to a duration of the second reconnect time. In some embodiments, the duration of the first reconnect time is different from the duration of the second reconnect time. In some embodiments, the SMO 120 is configured to determine at least one of the second time out or the second reconnect time based on a periodicity in which the inventory is updated. In some embodiments, the SMO 120 is configured to determine at least one of the second time out or the second reconnect time based on empirical data for new equipment to appear in the inventory. In some embodiments, the SMO 120 is configured to determine at least one of the second time out or the second reconnect time based on an input from a network manager. By using the second time out and the second reconnect time to disconnect the RU 110 from the SMO 120, processing capacity within the SMO 120 is able to be allocated to connecting other RUs to the telecommunication network. As a result, service to terminal devices is established faster across the entirety of the network by avoiding consuming SMO 120 capacity by continually attempting to connect the RU 110 that is not yet able to be properly connected to the telecommunication network.

In operation 136, a third time out is set and a third reconnect time is set. The third time out is a time period during which the RU 110 should await additional communication from the SMO 120 prior to dropping the connection to the SMO 120. The third reconnect time is a time period that the RU 110 should wait before sending a new connection request to the SMO 120. In some embodiments, the third time out ranges from about 45 seconds to about 5 minutes. In some embodiments, the third time out is about 1 minute. If the third time out is too long, then power consumption by the RU 110 and congestion of the connection with the SMO 120 increases, in some instances. If the third time out is too short, then a risk that the RU 110 drops the connection with the SMO 120 even when a successful connection to the DU is still likely based on the most recent connection request from the RU 110 to the SMO 120, in some instances. In some embodiments, a duration of the third time out is equal to a duration of each of the first time out and the second time out. In some embodiments, the duration of the third time out is different from the duration of at least one of the first time out or the second time out. In some embodiments, the third reconnect time ranges from about 1 hour to about 60 days. In some embodiments, the third reconnect time is about 45 days. If the third reconnect time is too long, then a delay in connecting the RU 110 to the DU, and the resulting ability to connect terminal devices to the RU 110, is increased, in some instances. If the third reconnect time is too short, then congestion and processing load within the SMO 120 increases without an increase in a likelihood of success in connecting the RU 110 to the DU, in some instances. In some embodiments, a duration of the third reconnect time is equal to a duration of each of the first reconnect time and the second reconnect time. In some embodiments, the duration of the third reconnect time is different from the duration of at least one of the first reconnect time or the second reconnect time. In some embodiments, the SMO 120 is configured to determine at least one of the third time out or the third reconnect time based on a periodicity in which the inventory is updated. In some embodiments, the SMO 120 is configured to determine at least one of the third time out or the third reconnect time based on empirical data for new equipment to appear in the inventory. In some embodiments, the SMO 120 is configured to determine at least one of the third time out or the third reconnect time based on an input from a network manager. By using the third time out and the third reconnect time to disconnect the RU 110 from the SMO 120, processing capacity within the SMO 120 is able to be allocated to connecting other RUs to the telecommunication network. As a result, service to terminal devices is established faster across the entirety of the network by avoiding consuming SMO 120 capacity by continually attempting to connect the RU 110 that is not yet able to be properly connected to the telecommunication network.

Using the method 100, the RU 110 is able to be connected to the telecommunication network by the SMO 120 with increased efficiency in comparison with other approaches that do not include the SMO 120, the time out, or reconnect time criteria. The efficiency is increased by replacing human action with automation using the SMO 120. Additional, efficiency is further increased by reducing processing load on the SMO 120; and by reducing congestion with connections to the SMO 120.

One of ordinary skill in the art would recognize that modifications to the method 100 are within the scope of this description. In some embodiments, the method 100 includes additional operations. For example, in some embodiments, the method 100 includes generating of an alert to the network manager in response to a failure of an RU to successfully connect to a DU following a threshold number of iterations of connection attempts. In some embodiments, an order of operations within the method 100 is adjusted. For example, in some embodiments, the operation 124 occurs prior to the operation 122. In some embodiments, at least one operation of the method 100 is omitted. For example, in some embodiments, the operation 128 is omitted and final connection with the RU 110 is facilitated using a device other than the SMO 120.

Figure 2:
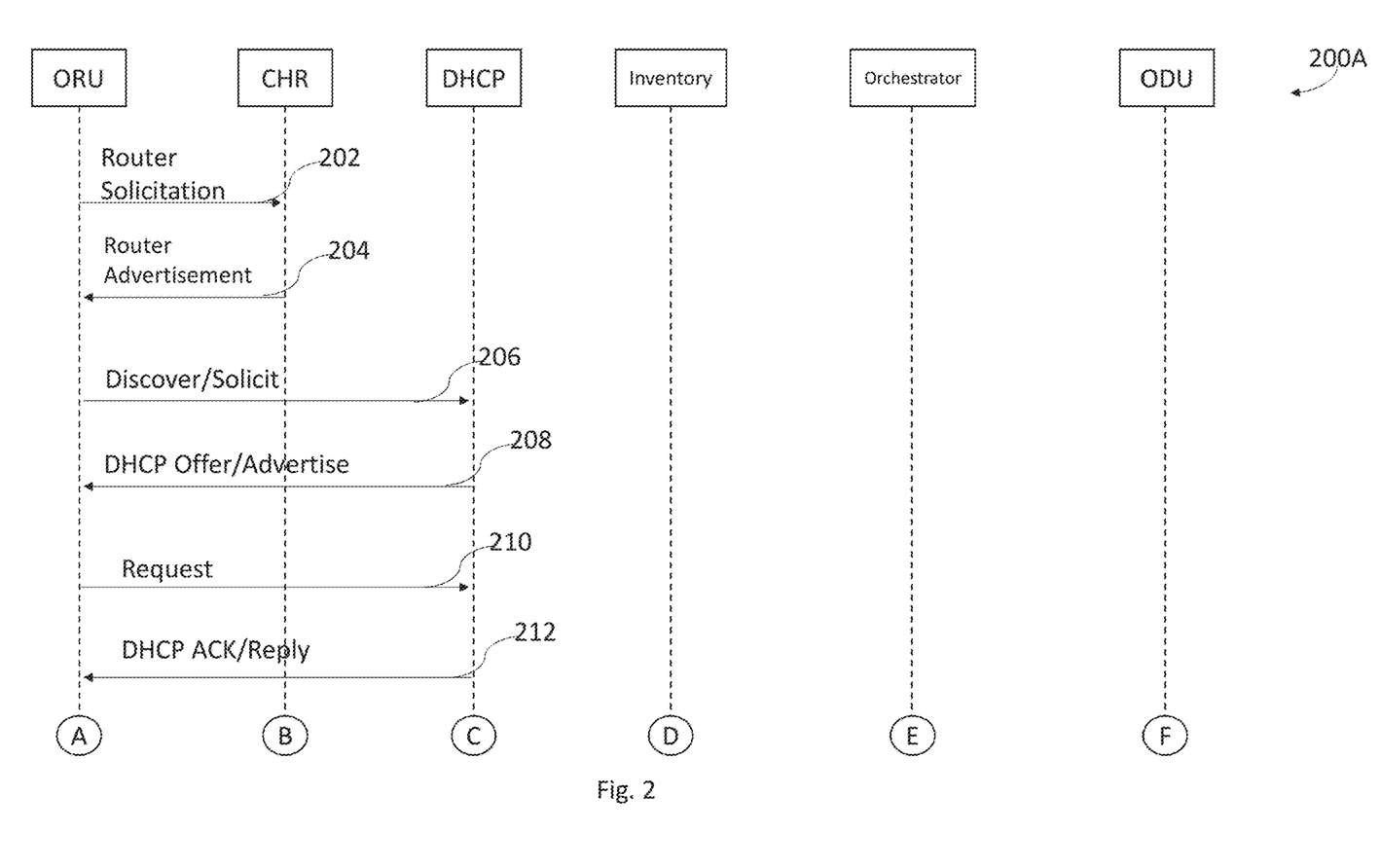
FIG. 2 is a sequence diagram for automating a power on notification in accordance with some embodiments.

FIG. 2 is a sequence diagram of for automating a power on notification in accordance with some embodiments. The sequence diagram is separated in five sequences diagrams 200A-200E for ease of understanding. The sequence diagram 200A is a sequence for establishing an initial connection for the ORU to send a connection request to the orchestrator, according to some embodiments. The sequence diagram 200B is a sequence for when the ORU is not found within an inventory, according to some embodiments. The sequence diagram 200C is a sequence for when the ODU is not found in the inventory, according to some embodiments. The sequence diagram 200D is a sequence for when the ORU is not properly configured to connect to the ODU, according to some embodiments. The sequence diagram 200E is a sequence for establishing a connection between the ORU and the ODU, according to some embodiments. One of ordinary skill in the art would understand that the sequence diagrams 200A-200E are capable of being performed together or separately. Further, one of ordinary skill in the art would understand that in some embodiments, the sequence diagrams 200A-200E are performed in a different order from that provided in the drawings. In some embodiments, the sequence diagram of FIG. 2 is usable to implement the method 100 (FIG. 1). In some embodiments, the sequence diagram of FIG. 2 is usable to implement a method other than the method 100 (FIG. 1).

In some embodiments, the ORU of the sequence diagram of FIG. 2 corresponds to the RU 110 (FIG. 1). In some embodiments, the ORU of the sequence diagram of FIG. 2 is different from the RU 110 (FIG. 1). In some embodiments, the orchestrator of the sequence diagram of FIG. 2 corresponds to the SMO 120 (FIG. 1). In some embodiments, the orchestrator of the sequence diagram of FIG. 2 is different from the SMO 120 (FIG. 1). In some embodiments, the ODU of the sequence diagram of FIG. 2 corresponds to the DU described with respect to the method 100 (FIG. 1). In some embodiments, the ODU of the sequence diagram of FIG. 2 is different from the DU described with respect to the method 100 (FIG. 1). In some embodiments, the inventory of the sequence diagram of FIG. 2 corresponds to the inventory described with respect to the method 100 (FIG. 1). In some embodiments, the inventory of the sequence diagram of FIG. 2 is different from the inventory described with respect to the method 100 (FIG. 1). A dynamic host configuration protocol (DHCP) is a protocol for dynamically assigning an IP address to a device, such as the ORU, to allow the device to communication using IP. In some embodiments, the DHCP is implemented using a processor in a server that is able to communication with the ORU. In some embodiments, the DHCP is implemented using a processor connected to a domain name system (DNS). A channel router (CHR) is configured to allow the ORU to communication with devices within the telecommunication network.

In sequence diagram 200A, the ORU transmits a router solicitation to the CHR in operation 202. The router solicitation includes a request for the ORU to connect to the CHR to permit the ORU to communicate with other devices within the telecommunication network.

In operation 204, the CHR provides a router advertisement to the ORU to allow the ORU to connect to the CHR. Once connected to the CHR, the ORU is able to communicate with other devices within the telecommunication network.

In operation 206, the ORU transmits a discover/solicit request to the DHCP. The discover/solicit request includes a request to connect to the DHCP.

In operation 208, the DHCP provides DHCP Offer/Advertise signal to the ORU. Using the DHCP Offer/Advertise signal, the ORU is able to establish a connection with the DHCP.

In operation 210, the ORU transmits a request to the DHCP. The request includes a request for an IP address assignable to the ORU.

In operation 212, the DHCP transmits a DHCP ACK/Reply to the ORU. The DHCP acknowledgement and reply includes an acknowledgement of the request from the ORU and an IP address usable by the ORU in response to the request received from the ORU. Using the IP address, the ORU is able to connect to the orchestrator in order to establish a connection to the ODU.

The sequence diagram 200A includes initial connection operations performed by the ORU in order to permit the ORU to communicate with the orchestrator, according to some embodiments. Following the operations of the sequence diagram 200A, the ORU attempts to establish communication with the ODU using the orchestrator.

In the sequence diagram 200B, the ORU initiates a connection with the orchestrator and the orchestrator determines whether the ORU is listed in the inventory of devices within the telecommunication network. In response to a determination that the ORU is listed in the inventory of devices within the telecommunication network, the orchestrator will attempt to determine which ODU within the telecommunication network to connect the ORU. In response to a determination that the ORU is not listed in the inventory of devices within the telecommunication network, the orchestrator will instruct the ORU to time out and set a reconnect time for the ORU to re-initiate a connection with the orchestrator. In some embodiments, the operations of the sequence diagram 200B correspond to operation 122 and operation 132 of the method 100 (FIG. 1). In some embodiments, the operations of the sequence diagram 200B are different from the method 100 (FIG. 1).

In operation 220, the ORU initiates a transmission control protocol (TCP) with the orchestrator. The TCP is a connection-oriented communications protocol that facilitates exchanging of messages between devices in the telecommunication network. In some embodiments, a connection protocol other than TCP is used by the ORU to initiate communication with the orchestrator.

In operation 222, a transport layer security (TLS) connection is established between the ORU and the orchestrator. The TLS connection is an IP connection that encrypts communications between the ORU and the orchestrator.

In operation 224, the ORU and the orchestrator share communication capabilities across the TLS connection. The communication capabilities provide information related to the type of communication each of the ORU and orchestrator are capable of performing. This information assists the orchestrator in managing the connection with the ORU during the process of connecting the ORU to the ODU.

In operation 226 a Netconf connection is established between the ORU and the orchestrator. Netconf is a protocol for installing, manipulating and deleting configuration of devices within a network. The Netconf connection utilizes extensible markup language (XML) encoding. In some embodiments, the connection between the ORU and the orchestrator uses a protocol other than Netconf, such as Restconf. The Netconf connection allows the orchestrator and the ORU to exchange information about the ORU in order to attempt to establish a connection between the ORU and the ODU.

In operation 228, the orchestrator transmits a get serial number signal to the ORU. The get serial number signal is usable to obtain identifying information for the ORU in order to determine whether the ORU is present in the inventory for the telecommunication network and where the ORU should be connected within the telecommunication network. One of ordinary skill in the art would recognize that the serial number is an example of identifying information for the ORU and the current description is not limited to this single example. For example, in some embodiments, the orchestrator is able to request other identifying information such as an IP address.

In operation 230, the ORU provides a remote procedure call (RPC) response that includes the serial number of the ORU in response to the get serial number signal received in operation 228. As noted above, one of ordinary skill in the art would recognize that the current description is not limited to the serial number as identifying information for the ORU.

In operation 232, the orchestrator sends an instruction to the inventory to get the fully qualified domain name (FQDN) of the parent ODU for the ORU. The parent ODU for the ORU is the ODU within the telecommunication network that is designated to control the ORU based on a network tree that provides the connections between various devices within the telecommunication network. The get parent ODU FQDN instruction includes the serial number, or other identifying information, for the ORU. Based on the serial number the inventory is able to cross-reference the ORU with the ODU within the telecommunication network assigned to control the ORU.

In operation 234, the inventory transmits a message to the orchestrator indicating that the ORU serial number was not found within the inventory.

In operation 236, the orchestrator sends an instruction to the ORU to set a first periodic timer. The first periodic timer includes information for a first time out and a first reconnect time. In some embodiments, the first time out is similar to the first time out discussed above with respect to the method 100 (FIG. 1). In some embodiments, the first reconnect time is similar to the first reconnect time discussed above with respect to the method 100 (FIG. 1).

In some embodiments, the first time out ranges from about 45 seconds to about 5 minutes. In some embodiments, the first time out is about 1 minute. If the first time out is too long, then power consumption by the ORU and congestion of the connection with the orchestrator increases, in some instances. If the first time out is too short, then a risk that the ORU drops the connection with the orchestrator even when a successful connection to the ODU is still likely based on the most recent connection request from the ORU to the orchestrator, in some instances. In some embodiments, the first reconnect time ranges from about 5 minutes to about 1 hour. In some embodiments, the first reconnect time is about 10 minutes. If the first reconnect time is too long, then a delay in connecting the ORU to the ODU, and the resulting ability to connect terminal devices to the ORU, is increased, in some instances. If the first reconnect time is too short, then congestion and processing load within the orchestrator increases without an increase in a likelihood of success in connecting the ORU to the ODU, in some instances. In some embodiments, the orchestrator is configured to determine at least one of the first time out or the first reconnect time based on a periodicity in which the inventory is updated. In some embodiments, the orchestrator is configured to determine at least one of the first time out or the first reconnect time based on empirical data for new equipment to appear in the inventory. In some embodiments, the orchestrator is configured to determine at least one of the first time out or the first reconnect time based on an input from a network manager. By using the first time out and the first reconnect time to disconnect the ORU from the orchestrator, processing capacity within the orchestrator is able to be allocated to connecting other ORUs to the telecommunication network. As a result, service to terminal devices is established faster across the entirety of the network by avoiding consuming orchestrator capacity by continually attempting to connect the ORU that is not yet able to be properly connected to the telecommunication network.

In operation 238, the ORU sends an RPC reply to the orchestrator confirming receipt of the first periodic timer.

The sequence diagram 200B is directed to a situation where the ORU serial number is not present in the inventory. One of ordinary skill in the art would understand that in a situation where the ORU serial number is present in the inventory, the inventory would attempt to locate the corresponding ODU based on the ORU serial number and provide the FQDN information for the ODU to the orchestrator.

Once the orchestrator has the FQDN of the ODU, the orchestrator will instruct the ODU and ORU to establish communication, e.g., as discussed with respect to sequence diagram 200E below.

In the sequence diagram 200C, the ORU initiates a connection with the orchestrator and the orchestrator determines whether the ODU is listed in the inventory of devices within the telecommunication network. In response to a determination that the ODU is listed in the inventory of devices within the telecommunication network, the orchestrator will attempt to connect the ORU to the ODU. In response to a determination that the ODU is not listed in the inventory of devices within the telecommunication network, the orchestrator will instruct the ORU to time out and set a reconnect time for the ORU to re-initiate a connection with the orchestrator. In some embodiments, the operations of the sequence diagram 200C correspond to operation 124 and operation 134 of the method 100 (FIG. 1). In some embodiments, the operations of the sequence diagram 200C are different from the method 100 (FIG. 1).

Operations 240-252 of the sequence diagram 200C are similar to the operations 220-232 of the sequence diagram 200B. The operations 240-252 are not discussed in detail for the sake of brevity.

In operation 254, the inventory transmits a message to the orchestrator indicating that the ODU was not found within the inventory. This indicates that while the ORU serial number is present in the inventory, the inventory does not currently include information indicating which ODU within the network tree is assigned to control the ORU.

In operation 256, the orchestrator sends an instruction to the ORU to set a second periodic timer. The second periodic timer includes information for a second time out and a second reconnect time. In some embodiments, the second time out is similar to the second time out discussed above with respect to the method 100 (FIG. 1). In some embodiments, the second reconnect time is similar to the second reconnect time discussed above with respect to the method 100 (FIG. 1). In some embodiments, the first periodic timer is equivalent to the second periodic timer. In some embodiments, the first periodic timer is different from the second periodic timer.

In some embodiments, the second time out ranges from about 45 seconds to about 5 minutes. In some embodiments, the second time out is about 1 minute. If the second time out is too long, then power consumption by the ORU and congestion of the connection with the orchestrator increases, in some instances. If the second time out is too short, then a risk that the ORU drops the connection with the orchestrator even when a successful connection to the ODU is still likely based on the most recent connection request from the ORU to the orchestrator, in some instances. In some embodiments, a duration of the first time out is equal to a duration of the second time out. In some embodiments, the duration of the first time out is different from the duration of the second time out. In some embodiments, the second reconnect time ranges from about 5 minutes to about 1 hour. In some embodiments, the second reconnect time is about 10 minutes. If the second reconnect time is too long, then a delay in connecting the ORU to the ODU, and the resulting ability to connect terminal devices to the ORU, is increased, in some instances. If the second reconnect time is too short, then congestion and processing load within the orchestrator increases without an increase in a likelihood of success in connecting the ORU to the ODU, in some instances. In some embodiments, a duration of the first reconnect time is equal to a duration of the second reconnect time. In some embodiments, the duration of the first reconnect time is different from the duration of the second reconnect time. In some embodiments, the orchestrator is configured to determine at least one of the second time out or the second reconnect time based on a periodicity in which the inventory is updated. In some embodiments, the orchestrator is configured to determine at least one of the second time out or the second reconnect time based on empirical data for new equipment to appear in the inventory. In some embodiments, the orchestrator is configured to determine at least one of the second time out or the second reconnect time based on an input from a network manager. By using the second time out and the second reconnect time to disconnect the ORU from the orchestrator, processing capacity within the orchestrator is able to be allocated to connecting other ORUs to the telecommunication network. As a result, service to terminal devices is established faster across the entirety of the network by avoiding consuming orchestrator capacity by continually attempting to connect the ORU that is not yet able to be properly connected to the telecommunication network.

In operation 258, the ORU sends an RPC reply to the orchestrator confirming receipt of the second periodic timer.

The sequence diagram 200C is directed to a situation where the ODU is not present in the inventory. One of ordinary skill in the art would understand that in a situation where the ODU is present in the inventory, the inventory would attempt to provide the FQDN information for the ODU to the orchestrator. Once the orchestrator has the FQDN of the ODU, the orchestrator will instruct the ODU and ORU to establish communication, e.g., as discussed with respect to sequence diagram 200E below.

In the sequence diagram 200D, the ORU initiates a connection with the orchestrator and the orchestrator determines whether the ODU FQDN is listed in the inventory of devices within the telecommunication network. In response to a determination that the ODU FQDN is listed in the inventory of devices within the telecommunication network, the orchestrator will attempt to connect the ORU to the ODU. In response to a determination that the configuration of the ORU does not match the configuration of the ODU, the orchestrator will instruct the ORU to time out and set a reconnect time for the ORU to re-initiate a connection with the orchestrator. In some embodiments, the operations of the sequence diagram 200D correspond to operation 126 and operation 136 of the method 100 (FIG. 1). In some embodiments, the operations of the sequence diagram 200D are different from the method 100 (FIG. 1).

Operations 260-272 of the sequence diagram 200D are similar to the operations 220-232 of the sequence diagram 200B. The operations 260-272 are not discussed in detail for the sake of brevity.

In operation 274, the inventory transmits the ODU FQDN to the orchestrator. This indicates that the inventory includes the ORU serial number and an ODU assigned to control the ORU. The inventory provides the ODU FQDN in order to allow the orchestrator to attempt to connect the ODU with the ORU.

In operation 276, the orchestrator sends an instruction to the ORU to set the parent ODU for the ORU. The instruction provides the FQDN of the ODU to permit the ORU to determine the configuration of the ODU and attempt to establish a connection with the ODU.

In operation 278, the ORU transmits an RPC reply to the orchestrator indicating receipt of the instruction to set the ODU FQDN. For the purposes of the sequence diagram 200D, the RPC reply in operation 278 includes information that the configuration of the ORU does not match the configuration of the ODU. One of ordinary skill in the art would understand that in a situation where the configuration of the ORU matches the configuration of the ODU, the ORU would attempt to establish a connection with the ODU, e.g., using the sequence diagram 200E discussed below. In some embodiments, the information related to the DU relates to the technology used by the DU, such as fifth generation (5G), fourth generation (4G), long term evolution (LTE), or other suitable communication technologies.

In operation 280, the orchestrator sends an instruction to the ORU to set a third periodic timer. The third periodic timer includes information for a third time out and a third reconnect time. In some embodiments, the third time out is similar to the third time out discussed above with respect to the method 100 (FIG. 1). In some embodiments, the third reconnect time is similar to the third reconnect time discussed above with respect to the method 100 (FIG. 1). In some embodiments, the third periodic timer is equivalent to each of the first periodic timer and second periodic timer. In some embodiments, the third periodic timer is different from at least one of the first periodic timer or the second periodic timer.

In some embodiments, the third time out ranges from about 45 seconds to about 5 minutes. In some embodiments, the third time out is about 1 minute. If the third time out is too long, then power consumption by the ORU and congestion of the connection with the orchestrator increases, in some instances. If the third time out is too short, then a risk that the ORU drops the connection with the orchestrator even when a successful connection to the ODU is still likely based on the most recent connection request from the ORU to the orchestrator, in some instances. In some embodiments, a duration of the third time out is equal to a duration of each of the first time out and the second time out. In some embodiments, the duration of the third time out is different from the duration of at least one of the first time out or the second time out. In some embodiments, the third reconnect time ranges from about 1 hour to about 60 days. In some embodiments, the third reconnect time is about 45 days. If the third reconnect time is too long, then a delay in connecting the ORU to the ODU, and the resulting ability to connect terminal devices to the ORU, is increased, in some instances. If the third reconnect time is too short, then congestion and processing load within the orchestrator increases without an increase in a likelihood of success in connecting the ORU to the ODU, in some instances. In some embodiments, a duration of the third reconnect time is equal to a duration of each of the first reconnect time and the second reconnect time. In some embodiments, the duration of the third reconnect time is different from the duration of at least one of the first reconnect time or the second reconnect time. In some embodiments, the orchestrator is configured to determine at least one of the third time out or the third reconnect time based on a periodicity in which the inventory is updated. In some embodiments, the orchestrator is configured to determine at least one of the third time out or the third reconnect time based on empirical data for new equipment to appear in the inventory. In some embodiments, the orchestrator is configured to determine at least one of the third time out or the third reconnect time based on an input from a network manager. By using the third time out and the third reconnect time to disconnect the ORU from the orchestrator, processing capacity within the orchestrator is able to be allocated to connecting other ORUs to the telecommunication network. As a result, service to terminal devices is established faster across the entirety of the network by avoiding consuming orchestrator capacity by continually attempting to connect the ORU that is not yet able to be properly connected to the telecommunication network.

In operation 282, the ORU sends an RPC reply to the orchestrator confirming receipt of the third periodic timer.

The sequence diagram 200D is directed to a situation where the configuration of the ORU does not match the configuration of the ODU. One of ordinary skill in the art would understand that in a situation where the configuration of the ODU matches the configuration of the ORU, the orchestrator will instruct the ODU and ORU to establish communication, e.g., as discussed with respect to sequence diagram 200E below.

In sequence diagram 200E, the ORU establishes a connection with the ODU provided to the ORU by the orchestrator. In some embodiments, the sequence diagram 200E corresponds to the operation 128 of the method 100 (FIG. 1). In some embodiments, the sequence diagram 200E is different from the operation 128 of the method 100 (FIG. 1).

In operation 290, a Netconf connection is established between the ORU and the parent ODU.

In operation 292, the ORU requests and receives communication protocols from the ODU In operation 294, the ORU and the ODU establish and maintain a Netconf connection based on the communication protocols.

The sequence diagram 200E is directed to a situation where the ORU and the ODU successfully establish a connection. Based on the successfully establish connection, the ORU is able to provide connections for terminal devices to the telecommunication network through the ODU.

Figure 3:
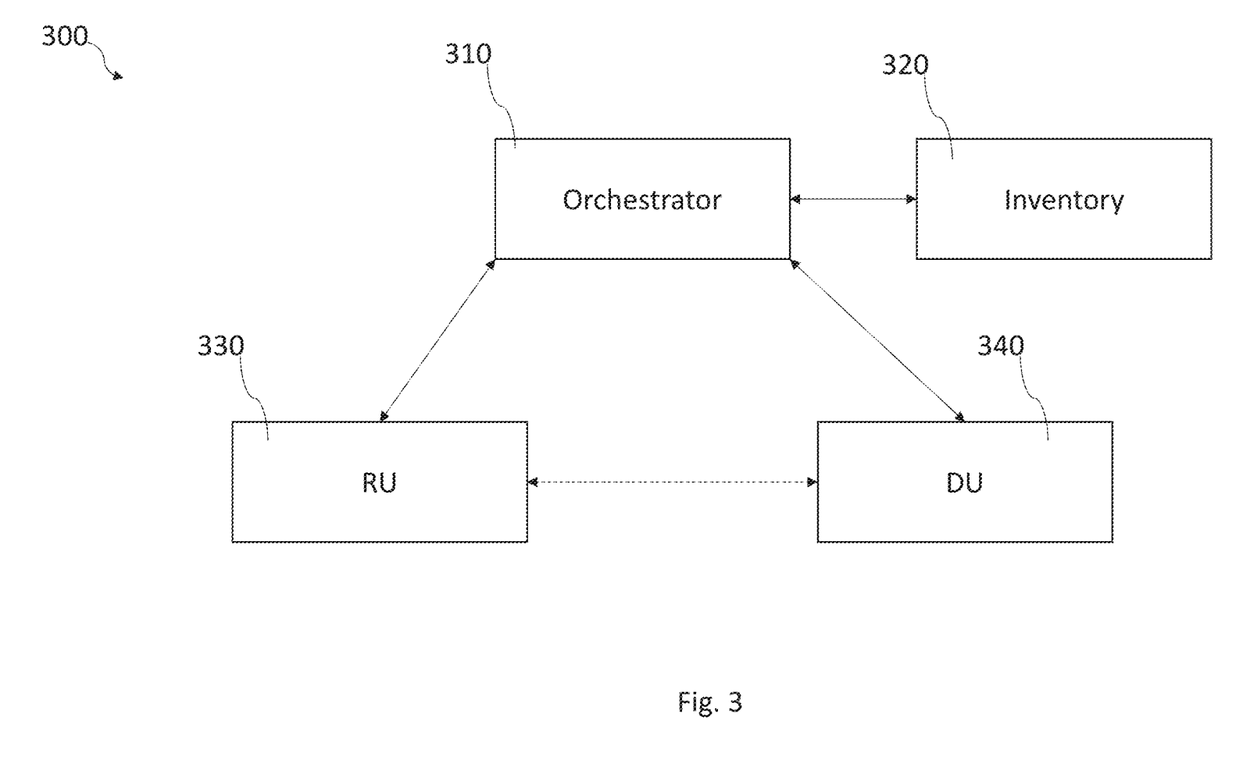
FIG. 3 is a block diagram of an automated power on notification system in accordance with some embodiments.

FIG. 3 is a block diagram of an automated power on notification system 300 in accordance with some embodiments. The automated power on notification system 300 includes an orchestrator 310, an inventory 320, an RU 330 and a DU 340. In some embodiments, the orchestrator 310 corresponds to the SMO 120 (FIG. 1) or the orchestrator in FIG. 2. In some embodiments, the orchestrator is different from the SMO 120 (FIG. 1) or the orchestrator in FIG. 2. In some embodiments, the inventory 320 corresponds to the inventory described with respect to the method 100 (FIG. 1) or the inventory in FIG. 2. In some embodiments, the inventory is different from the inventory discussed with respect to the method 100 (FIG. 1) or the inventory in FIG. 2. In some embodiments, the RU 330 corresponds to the RU 110 (FIG. 1) or the ORU in FIG. 2. In some embodiments, the RU 330 is different from the RU 110 (FIG. 1) or the ORU in FIG. 2. In some embodiments, the DU 340 corresponds to the DU described with respect to the method 100 (FIG. 1) or the ODU in FIG. 2. In some embodiments, the DU 340 is different from the DU described in the method 100 (FIG. 1) or the ODU in FIG. 2. In some embodiments, the automated power on notification system 300 is configured to implement the method 100 (FIG. 1). In some embodiments, the automated power on notification system 300 is configured to implement the sequence diagram of FIG. 2. In some embodiments, the automated power on notification system 300 is configured to implement a process other than the method 100 (FIG. 1) or the sequence diagram in FIG. 2.

The orchestrator 310 is configured to communication with the RU 330, via a wired or wireless connection, in order to receive identifying information from the RU 330. In some embodiments, the identifying information includes a serial number, an IP address, or other suitable identifying information for the RU 330. The orchestrator 310 is configured to communication with the inventory 320, via a wired or wireless connection, to provide the identifying information from the RU 330 to the inventory to determine which DU within a telecommunication network is assigned to control the RU 330.

In response to a situation where the inventory 320 is able to properly identify the RU 330 and the DU assigned to control the RU 330, the inventory provides the FQDN for the DU 340 (the assigned DU for controlling the RU 330) to the orchestrator 310. The orchestrator 310 then provides the FQDN for DU 340 to the RU 330; and the RU 330 attempts to establish a connection with the DU 340. In some embodiments, the RU 330 is configured to establish the connection with the DU 340 according to the sequence diagram 200E (FIG. 2). In some embodiments, the RU 330 is configured to establish the connection with the DU 340 according to a protocol other than the sequence diagram 200E (FIG. 2).

In response to a situation where the inventory 320 is unable to properly identify the RU 330; fails to identify the DU assigned to control the RU 330; or the RU 330 configuration does not match the configuration of the DU 340, the orchestrator is configured to transmit periodic timer information to the RU 330. The periodic timer information instructs the RU 330 to sever the connection with the orchestrator 310 and to wait for a reconnect time to elapse before re-initiating the connection with the orchestrator. In some embodiments, the periodic timer is selected based on the type of failure experienced in attempting to connect the RU 330 to the DU 340. In some embodiments, the orchestrator 310 is configured to transmit the first periodic timer of the sequence diagram 200B (FIG. 2) in response to the inventory 320 failing to properly identify the RU 330. In some embodiments, the orchestrator 310 is configured to transmit the second periodic timer of the sequence diagram 200C (FIG. 2) in response to the inventory 320 failing to identify the DU assigned to control the RU 330. In some embodiments, the orchestrator 310 is configured to transmit the third periodic timer of the sequence diagram 200D (FIG. 2) in response to the configuration of the RU 330 failing to match the configuration of the DU 340.

Using the automated power on notification system 300, the RU 330 is able to be connected to the telecommunication network by the orchestrator 310 with increased efficiency in comparison with other approaches that do not include the orchestrator 310. The efficiency is increased by replacing human action with automation using the orchestrator 310. Additional, efficiency is further increased by reducing processing load on the orchestrator 310; and by reducing congestion with connections to the orchestrator 310.

Figure 4:
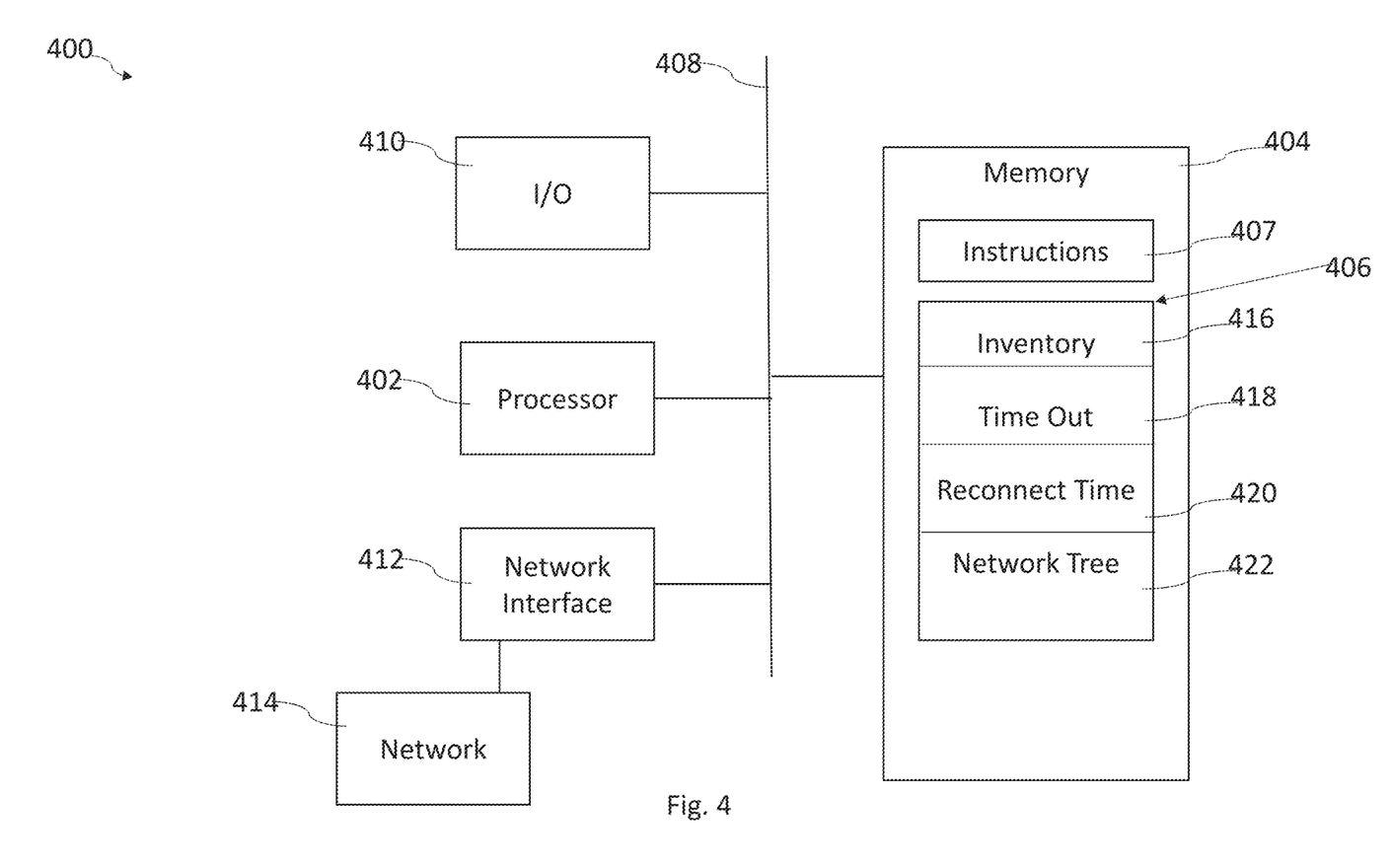
FIG. 4 is a block diagram of an orchestrator for implementing an automated power on notification system in accordance with some embodiments.

FIG. 4 is a block diagram of an orchestrator 400 for implementing an automated power on notification system in accordance with some embodiments. Orchestrator 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with external devices. The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting to external elements via network 414. The processor 402 is configured to execute the computer program code 406 encoded in the computer readable storage medium 404 in order to cause orchestrator 400 to be usable for performing a portion or all of the operations as described in the method 100 (FIG. 1), the sequence diagrams 200A-200E, or the automated power on notification system 300 (FIG. 3).

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 404 stores the computer program code 406 configured to cause orchestrator 400 to perform a portion or all of the operations as described in the method 100 (FIG. 1), the sequence diagrams 200A-200E, or the automated power on notification system 300 (FIG. 3). In some embodiments, the storage medium 404 also stores information needed for performing a portion or all of the operations as described in the method 100 (FIG. 1), the sequence diagrams 200A-200E, or the automated power on notification system 300 (FIG. 3) as well as information generated during performing a portion or all of the operations as described in the method 100 (FIG. 1), the sequence diagrams 200A-200E, or the automated power on notification system 300 (FIG. 3), such as an inventory parameter 416, a time out parameter 418, a reconnect time parameter 420, a network tree parameter 422, and/or a set of executable instructions to perform the operation of a portion or all of the operations as described in the method 100 (FIG. 1), the sequence diagrams 200A-200E, or the automated power on notification system 300 (FIG. 3).

In some embodiments, the storage medium 404 stores instructions 407 for interfacing with external devices. The instructions 407 enable processor 402 to generate instructions readable by the external devices to effectively implement a portion or all of the operations as described in the method 100 (FIG. 1), the sequence diagrams 200A-200E, or the automated power on notification system 300 (FIG. 3).

Orchestrator 400 includes I/O interface 410. I/O interface 410 is coupled to external circuitry. In some embodiments, I/O interface 410 includes a keyboard, keypad, mouse, trackball, trackpad, and/or cursor direction keys for communicating information and commands to processor 402.

Orchestrator 400 also includes network interface 412 coupled to the processor 402. Network interface 412 allows orchestrator 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in the method 100 (FIG. 1), the sequence diagrams 200A-200E, or the automated power on notification system 300 (FIG. 3) is implemented in two or more orchestrators 500, and information such as inventory, time out, reconnect time, or network tree are exchanged between different orchestrators 400 via network 414.

An aspect of this description relates to an automated power on notification system. The automated power on notification system includes a non-transitory computer readable medium configured to store instructions thereon. The automated power on notification system includes a processor connected to the non-transitory computer readable medium. The processor is configured to execute the instructions for detecting a failure to establish a connection with a newly powered on component. The processor is further configured to execute the instructions for instructing a transmitter to transmit a periodic timer signal to the newly powered on component, wherein the periodic timer signal indicates a time period for the newly powered on component to wait prior to repeating an attempt to connect to a network. The processor is further configured to execute the instructions for receiving a connection request from the newly powered on component after the time period has elapsed. The processor is further configured to execute the instructions for establishing a connection between the newly powered on component and the network. In some embodiments, the processor is further configured to instruct the transmitter to transmit the periodic timer comprising a first periodic timer to the newly powered on component in response to the failure being identifying information of the newly powered on component being absent from an inventory. In some embodiments, the processor is further configured to instruct the transmitter to transmit the periodic timer comprising a second periodic timer to the newly powered on component in response to the failure being a network component assigned to control the newly powered on component being absent from an inventory. In some embodiments, the processor is further configured to instruct the transmitter to transmit the periodic timer comprising a third periodic timer to the newly powered on component in response to the failure being a configuration of the newly powered on component being different from a configuration of the network component. In some embodiments, the first periodic timer is equal to each of the second periodic timer and the third periodic timer. In some embodiments, the first periodic timer is different from at least one of the second periodic timer or the third periodic timer. In some embodiments, the identifying information includes a serial number of the newly powered on component.

An aspect of this description relates to an automated power on notification method. The automated power on notification method includes detecting, using a processor, a failure to establish a connection with a newly powered on component. The automated power on notification method further includes transmitting a periodic timer signal to the newly powered on component, wherein the periodic timer signal indicates a time period for the newly powered on component to wait prior to repeating an attempt to connect to a network. The automated power on notification method further includes receiving a connection request from the newly powered on component after the time period has elapsed. The automated power on notification method further includes establishing a connection between the newly powered on component and the network. In some embodiments, transmitting the periodic timer includes transmitting a first periodic timer to the newly powered on component in response to the failure being identifying information of the newly powered on component being absent from an inventory. In some embodiments, transmitting the periodic timer includes transmitting a second periodic timer to the newly powered on component in response to the failure being a network component assigned to control the newly powered on component being absent from an inventory. In some embodiments, transmitting the periodic timer includes transmitting a third periodic timer to the newly powered on component in response to the failure being a configuration of the newly powered on component being different from a configuration of the network component. In some embodiments, the first periodic timer is equal to each of the second periodic timer and the third periodic timer. In some embodiments, the first periodic timer is different from at least one of the second periodic timer or the third periodic timer. In some embodiments, the identifying information includes a serial number of the newly powered on component.

An aspect of this description relates to a non-transitory computer readable medium configured to store instructions. The instructions when executed cause a processor to detect a failure to establish a connection with a newly powered on component. The instructions further cause the processor to instruct a transmitter to transmit a periodic timer signal to the newly powered on component, wherein the periodic timer signal indicates a time period for the newly powered on component to wait prior to repeating an attempt to connect to a network. The instructions further cause the processor to receive a connection request from the newly powered on component after the time period has elapsed. The instructions further cause the processor to establish a connection between the newly powered on component and the network. In some embodiments, the instructions are configured to cause the processor to instruct the transmitter to transmit the periodic timer by transmitting a first periodic timer to the newly powered on component in response to the failure being identifying information of the newly powered on component being absent from an inventory. In some embodiments, the instructions are configured to cause the processor to instruct the transmitter to transmit the periodic timer by transmitting a second periodic timer to the newly powered on component in response to the failure being a network component assigned to control the newly powered on component being absent from an inventory. In some embodiments, the instructions are configured to cause the processor to instruct the transmitter to transmit the periodic timer by transmitting a third periodic timer to the newly powered on component in response to the failure being a configuration of the newly powered on component being different from a configuration of the network component. In some embodiments, the first periodic timer is equal to each of the second periodic timer and the third periodic timer. In some embodiments, the first periodic timer is different from at least one of the second periodic timer or the third periodic timer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An automated power on notification system comprising:
   a non-transitory computer readable medium configured to store instructions thereon; and
   a processor connected to the non-transitory computer readable medium, wherein the processor is configured to execute the instructions for:

detecting a failure to establish a connection with a newly powered on component;

instructing a transmitter to transmit a periodic timer signal to the newly powered on component, wherein the periodic timer signal indicates a time period for the newly powered on component to wait prior to repeating an attempt to connect to a network;

receiving a connection request from the newly powered on component after the time period has elapsed;

instruct the transmitter to transmit the periodic timer comprising a first periodic timer to the newly powered on component in response to the failure being identifying information of the newly powered on component being absent from an inventory; and establishing a connection between the newly powered on component and the network.

2. The automated power on notification system of claim 1, wherein the time period ranges from 5 minutes to 1 hour.

3. The automated power on notification system of claim 1, wherein the processor is further configured to instruct the transmitter to transmit the periodic timer comprising a second periodic timer to the newly powered on component in response to the failure being a network component assigned to control the newly powered on component being absent from an inventory.

4. The automated power on notification system of claim 3, wherein the processor is further configured to instruct the transmitter to transmit the periodic timer comprising a third periodic timer to the newly powered on component in response to the failure being a configuration of the newly powered on component being different from a configuration of the network component.

5. The automated power on notification system of claim 4, wherein the first periodic timer is equal to each of the second periodic timer and the third periodic timer.

6. The automated power on notification system of claim 4, wherein the first periodic timer is different from at least one of the second periodic timer or the third periodic timer.

7. The automated power on notification system of claim 1, wherein the identifying information comprises a serial number of the newly powered on component.

8. An automated power on notification method comprising:

detecting, using a processor, a failure to establish a connection with a newly powered on component;

transmitting a periodic timer signal to the newly powered on component, wherein the periodic timer signal indicates a time period for the newly powered on component to wait prior to repeating an attempt to connect to a network, wherein transmitting the periodic timer comprises transmitting a first periodic timer to the newly powered on component in response to the failure being identifying information of the newly powered on component being absent from an inventory;

receiving a connection request from the newly powered on component after the time period has elapsed; and establishing a connection between the newly powered on component and the network.

9. The automated power on notification method of claim 8, wherein the time period ranges from 5 minutes to 1 hour.

10. The automated power on notification method of claim 8, wherein transmitting the periodic timer comprises transmitting a second periodic timer to the newly powered on component in response to the failure being a network component assigned to control the newly powered on component being absent from an inventory.

11. The automated power on notification method of claim 10, wherein transmitting the periodic timer comprises transmitting a third periodic timer to the newly powered on component in response to the failure being a configuration of the newly powered on component being different from a configuration of the network component.

12. The automated power on notification method of claim 11, wherein the first periodic timer is equal to each of the second periodic timer and the third periodic timer.

13. The automated power on notification method of claim 11, wherein the first periodic timer is different from at least one of the second periodic timer or the third periodic timer.

14. The automated power on notification system of claim 8, wherein the identifying information comprises a serial number of the newly powered on component.

15. A non-transitory computer readable medium configured to store instructions that when executed cause a processor to:

detect a failure to establish a connection with a newly powered on component;

instruct a transmitter to transmit a periodic timer signal to the newly powered on component, wherein the periodic timer signal indicates a time period for the newly powered on component to wait prior to repeating an attempt to connect to a network;

receive a connection request from the newly powered on component after the time period has elapsed;

instruct the transmitter to transmit the periodic timer by transmitting a first periodic timer to the newly powered on component in response to the failure being identifying information of the newly powered on component being absent from an inventory; and establish a connection between the newly powered on component and the network.

16. The non-transitory computer readable medium of claim 15, wherein the time period ranges from 5 minutes to 1 hour.

17. The non-transitory computer readable medium of claim 15, wherein the instructions are configured to cause the processor to instruct the transmitter to transmit the periodic timer by transmitting a second periodic timer to the newly powered on component in response to the failure being a network component assigned to control the newly powered on component being absent from an inventory.

18. The non-transitory computer readable medium of claim 17, wherein the instructions are configured to cause the processor to instruct the transmitter to transmit the periodic timer by transmitting a third periodic timer to the newly powered on component in response to the failure being a configuration of the newly powered on component being different from a configuration of the network component.

19. The non-transitory computer readable medium of claim 18, wherein the first periodic timer is equal to each of the second periodic timer and the third periodic timer.

20. The non-transitory computer readable medium of claim 18, wherein the first periodic timer is different from at least one of the second periodic timer or the third periodic timer.

* * * * *